United States Patent
Whyte (10) Patent No.: US 8,055,633 B2
(45) Date of Patent: Nov. 8, 2011

(54) METHOD, SYSTEM AND COMPUTER PROGRAM PRODUCT FOR DUPLICATE DETECTION

(75) Inventor: James Richard Hamilton Whyte, Maidenhead (GB)

(73) Assignee: International Business Machines Corporation, Armonk, NY (US)

(*) Notice: Subject to any disclaimer, the term of this patent is extended or adjusted under 35 U.S.C. 154(b) by 491 days.

(21) Appl. No.: 12/357,033

(22) Filed: Jan. 21, 2009

(65) Prior Publication Data

US 2009/0187546 A1 Jul. 23, 2009

(51) Int. Cl.
*G06F 7/00* (2006.01)
*G06F 17/00* (2006.01)
(52) U.S. Cl. ...................................................... 707/692
(58) Field of Classification Search .................. None
See application file for complete search history.

(56) References Cited

U.S. PATENT DOCUMENTS

| | | | |
|---|---|---|---|
| 6,804,667 | B1 | 10/2004 | Martin |
| 6,988,124 | B2 | 1/2006 | Douceur et al. |
| 2003/0037022 | A1 | 2/2003 | Adya et al. |
| 2008/0154852 | A1* | 6/2008 | Beyer et al. ................ 707/3 |

OTHER PUBLICATIONS

Bloom, Space/Time Trade-offs in Hash Coding with Allowable Errors, Jul. 1970, ACM, vol. 13 No. 7, pp. 422-427.*
Deng, Approximately Detecting Duplicates for Streaming Data using Stable Bloom Filters, Jun. 29, 2006, SIGMOD 2006, pp. 25-36.*

* cited by examiner

*Primary Examiner* — Pierre Vital
*Assistant Examiner* — Jason Liao
(74) *Attorney, Agent, or Firm* — Sylvia Rodriguez; David A. Mims, Jr.

(57) ABSTRACT

A method of duplicate detection for data items in a stream of data items, the method comprising the steps of: receiving a data item from the stream of data items; applying at least two different hashing algorithms to the data item to generate hash keys that identify elements in a first bloom filter data structure having a plurality of elements; checking a state of each of the identified elements to determine if the data item is a potential duplicate, the determination depending on whether the identified elements are indicated as having been also identified for a previous data item received from the stream; and in response to the determination that the data item is a potential duplicate, checking an index of hash keys to determine if at least one of the generated hash keys exists in the index to identify the data item as an actual duplicate.

16 Claims, 4 Drawing Sheets

METHOD, SYSTEM AND COMPUTER PROGRAM PRODUCT FOR DUPLICATE DETECTION

CROSS REFERENCE TO RELATED APPLICATIONS

This application claims priority to Foreign Patent Application No. 08150460.7 entitled "METHOD, SYSTEM AND COMPUTER PROGRAM PRODUCT FOR DUPLICATE DETECTION", filed on Jan. 21, 2008, and claiming the same priority date, which is incorporated herein by reference and assigned to the assignee herein.

FIELD OF THE INVENTION

The present invention relates to the detection of duplicate data items. In particular, it relates to the detection of duplicate data items received over a stream of data items.

BACKGROUND

In systems operating with streams of data items, in particular data items stored as messages (or parts of messages) in a message stream, it can be important that duplication of data is avoided. For example, in financial transactions, duplication of data items in transactions can result in the application of a transactional operation multiple times. Where such an operation is not idempotent (in that the result is not the same after multiple applications of the operation) undesirable or unintentional effects can result. It is therefore essential in such systems that duplication of data items is at least detected.

Existing techniques for identifying duplicates will normally involve comparing a new data item received in a stream of data items to a list of all data items received to identify a duplicate. If the new data item is not a duplicate of any item in the list then the new data item is determined not to be a duplicate and it is added to the list. Thus the list needs to be interrogated for all new data items received in a stream, including data items that are not duplicates. Further, the list of data items is continually growing and, consequently, continually consuming more resource. As the list grows, the process of comparing all new data items to the list becomes increasingly resource intensive due to the resource required searching a continually growing list. Also, since all received data items need to be checked against the list, the resource overhead of checking a continually growing list affects each and every data item received.

SUMMARY

The present invention provides, in one embodiment, a method of duplicate detection for data items in a stream of data items, the method comprising the steps of: receiving a data item from the stream of data items; applying at least two different hashing algorithms to the data item to generate hash keys that identify elements in a first bloom filter data structure having a plurality of elements; checking a state of each of the identified elements to determine if the data item is a potential duplicate, the determination depending on whether the identified elements are indicated as having been also identified for a previous data item received from the stream; and in response to the determination that the data item is a potential duplicate, checking an index of hash keys to determine if at least one of the generated hash keys exists in the index to identify the data item as an actual duplicate.

Preferably the method further comprises, in response to a determination that the data item is not one of: a potential duplicate; and an actual duplicate, adding at least one of the generated hash keys to the index of hash keys and indicating, in the first bloom filter data structure, that the identified elements have been identified for the data item.

Preferably, the at least two different hashing algorithms comprise three cryptographic strength hashing algorithms.

Preferably, in response to a determination that a predetermined criterion is satisfied, a second bloom filter data structure is generated and the generated hash keys identify elements in both the first and second bloom filter data structures, and the determination that the data item is a potential duplicate depends on whether the identified elements are indicated as having been also identified for a previous data item received from the stream in any of the first and second bloom filter data structures, and the method further comprises the step of: in response to a determination that the data item is not one of: a potential duplicate; and an actual duplicate, adding at least one of the generated hash keys to the index of hash keys and indicating, in the second bloom filter data structure, that the identified elements have been identified for the data item.

Preferably the at least two different hashing algorithms comprise three cryptographic strength hashing algorithms.

Preferably the predetermined criterion includes a condition that a predetermined proportion of the elements of the first bloom filter are used to indicate a data item having been received from the stream.

Preferably the predetermined proportion of the elements of the first bloom filter is in the region of 10 to 20 percent of the elements. Most preferably the predetermined proportion of the elements of the first bloom filter is 15% of the elements.

Preferably the method further comprises, in response to a determination that the data item is a potential duplicate and the data item is not an actual duplicate, incrementing a false positive counter.

Preferably the predetermined criterion includes a condition that the false positive counter does not exceed a predetermined threshold. Preferably the predetermined threshold is defined in terms of a proportion of all data items received from the stream. Preferably the predetermined threshold is 0.002% of all data items received from the stream.

Preferably the first and second bloom filter data structures have a size corresponding to a number of elements that is a product of an estimated frequency of receipt of data items from the stream, a length of a period that the bloom filter data structure is required to represent and a value corresponding to the predetermined proportion of the elements of the first bloom filter.

Preferably the first bloom filter data structure is discardable after a predetermined time period.

The present invention provides, in another embodiment, a system for duplicate detection for data items in a stream of data items, the system comprising: means for receiving a data item from the stream of data items; means for applying at least two different hashing algorithms to the data item to generate hash keys that identify elements in a first bloom filter data structure having a plurality of elements; means for checking a state of each of the identified elements to determine if the data item is a potential duplicate, the determination depending on whether the identified elements are indicated as having been also identified for a previous data item received from the stream; and means for, in response to the determination that the data item is a potential duplicate, checking an index of hash keys to determine if at least one of the generated hash keys exists in the index to identify the data item as an actual duplicate.

The present invention provides, in yet another embodiment, a computer program product including a computer program element comprising computer program code to, when loaded into a computer system and executed thereon, causes the computer to perform the steps of a method as described above.

BRIEF DESCRIPTION OF THE DRAWINGS

A preferred embodiment of the present invention is described below in more detail, by way of example only, with reference to the accompanying drawings, in which.

DETAILED DESCRIPTION OF THE PREFERRED EMBODIMENTS

Figure 1:
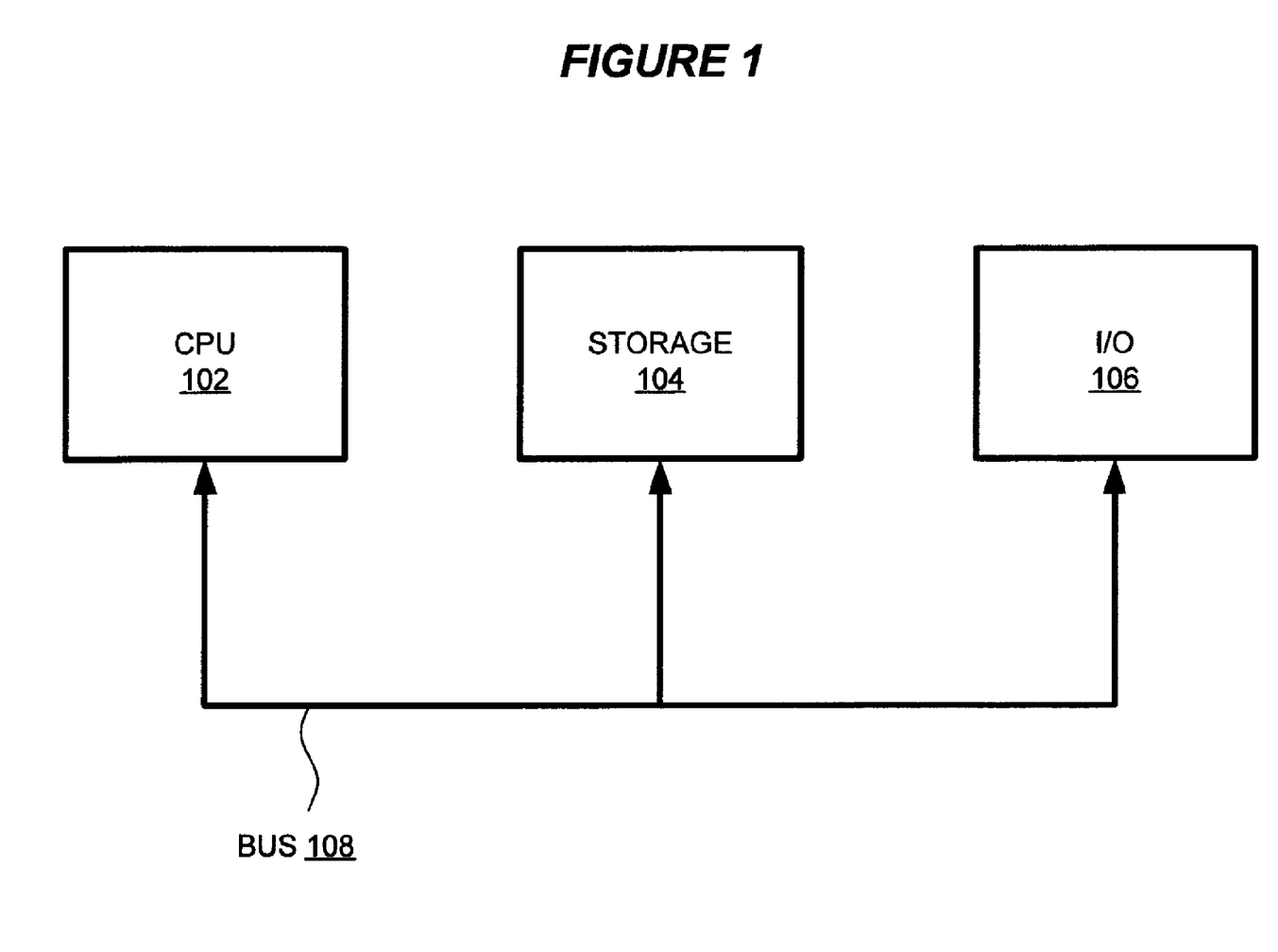
FIG. 1 illustrates a block diagram of a computer system suitable for the operation of embodiments of the present invention.

FIG. 1 illustrates a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
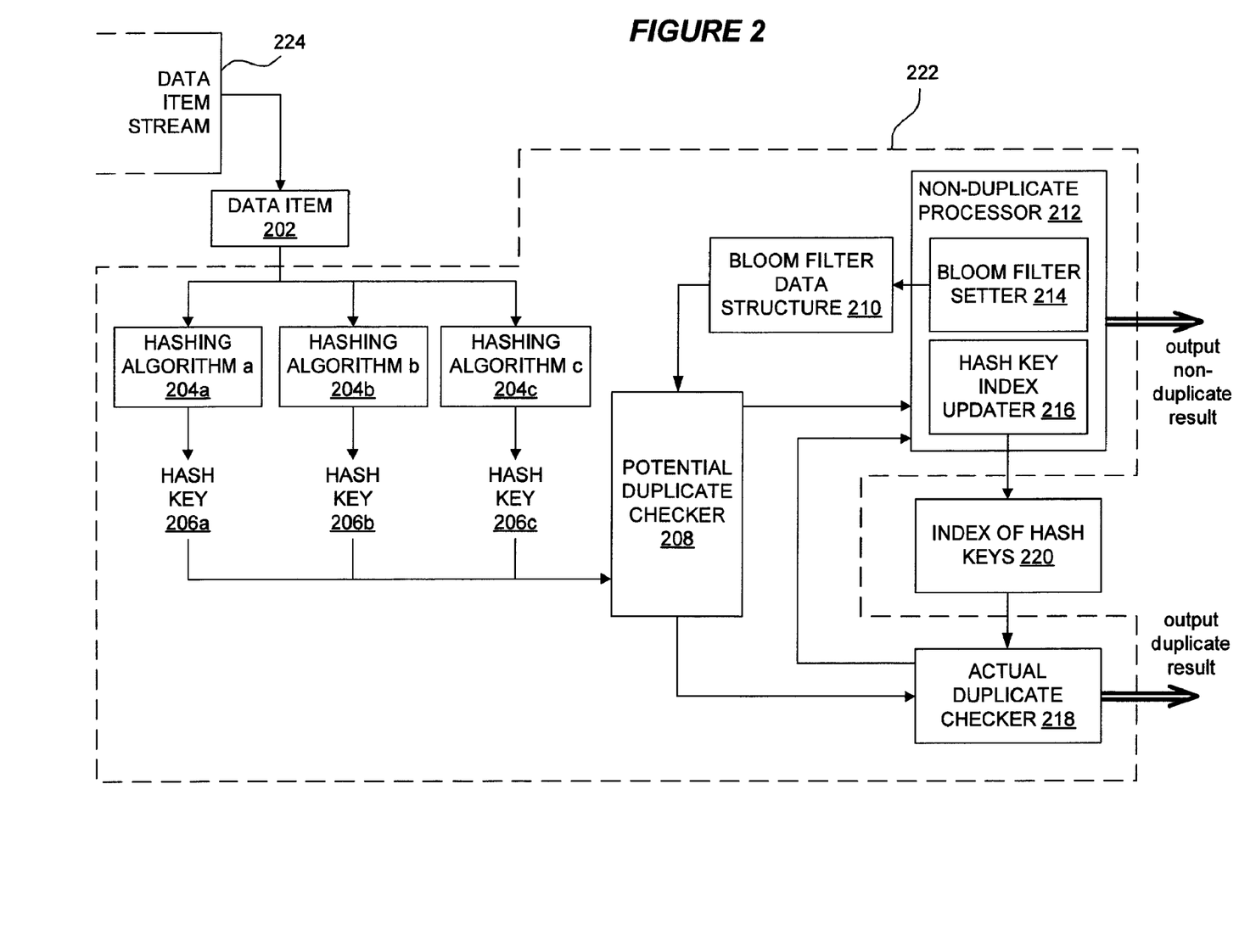
FIG. 2 illustrates a block diagram of a duplicate detector in accordance with a preferred embodiment of the present invention.

FIG. 2 illustrates a block diagram of a duplicate detector 222 in accordance with a preferred embodiment of the present invention. FIG. 2 illustrates a stream of data items 224 such as may be received by a computer system or within a computer system in operation. A stream corresponds to a succession of data items being received over time. For example, the stream of data items 224 can be a message stream for communicating messages between computing entities such as software or hardware entities. A single data item 202 is illustrated as being received from the data item stream 224. It will be appreciated by those skilled in the art that the data item 202 may alternatively be a message from a message stream, or a part of a message corresponding to the substantive content or payload of the message. As such, the data item 202 corresponds to the whole or part of a data item received from the stream 224 that is pertinent for the purpose of duplicate detection. For example, the data item 202 may not include a header, footer, or other information not so pertinent.

The duplicate detector 222 of FIG. 2 is a software or hardware component suitable for detecting data items received from the data stream 224 that are duplicates. That is to say that if data item 202 is a duplicate of a data item previously received by the duplicate detector 222, the duplicate detector 222 is operable to indicate that this is the case. Similarly, if data item 202 is not a duplicate of a data item previously received by the duplicate detector 222, the duplicate detector 222 is operable to indicate that this is the case.

The duplicate detector 222 includes a bloom filter data structure 210 (hereinafter a "bloom filter"). A bloom filter is well known in the art and is described here to provide context to the preferred embodiments of the present invention. The present characterization of bloom filter 210 is intended to be entirely exemplary and should not be considered to be limiting on any particular embodiment of such a data structure. Those skilled in the art will be aware that the bloom filter 210 may be implemented in many ways of which the present characterization is only one. The bloom filter 210 can be organized as a data structure of elements, each element suitable for storing a flag such as a single bit. The bloom filter 210 has associated a number of hashing algorithms 204 that are operable to generate hash key values 206 from a given input parameter. Each hash key value 206 identifies a single element in the bloom filter 210. Thus, for a given input parameter (such as data item 202), three elements in the bloom filter are identified. A parameter can be recorded in the bloom filter 210 by setting a flag at each element of the bloom filter 210 identified by the hashing algorithms 204. A subsequent input parameter can be determined to be different to an earlier input parameter by identifying that at least one element in the bloom filter 210 indicated by hash keys generated for the subsequent input parameter is unset. As is well understood in the art, bloom filters are therefore capable of positively identifying differences between input parameters, but may be susceptible to false positives in identifying identity between input parameters. This is because hashing functions are susceptible to generate hash keys corresponding to the same element in the bloom filter 210 for different inputs. However, the possibility of false positives in identifying identity between input parameters can be reduced, for example by employing numerous hashing algorithms to set numerous elements of the bloom filter.

In use, the bloom filter 210 of the duplicate detector 222 is used to detect whether data item 202 is a potential duplicate. Each non-duplicate data item received from the stream 224 is added to the bloom filter 210 by setting a flag at each element in the bloom filter 210 indicated by hash keys generated for the data item (see step 316 with respect to FIG. 3 below). Data item 202 (received subsequently) is checked against the bloom filter 210 by a potential duplicate checker 208. The potential duplicate checker 208 is a software or hardware component suitable for determining whether the data item 202 is a potential duplicate of any data item previously received from the data stream 224. The potential duplicate checker 208 checks the state of elements in the bloom filter 210 identified by the hash keys 206. If any of the identified elements in the bloom filter 210 are unset, then the data item 202 cannot be a duplicate of any earlier received data item. Alternatively, if any of the identified elements in the bloom filter 210 are set, then the data item 202 is a potential duplicate of an earlier received data item.

Where the potential duplicate checker 208 determines that the data item 202 is not a potential duplicate, the non-duplicate processor 212 processes the data item. Non-duplicate processor 212 includes a bloom filter setter 214 and a hash key index updater 216.

The bloom filter setter 214 is a software or hardware component operable to set flags in elements of the bloom filter 210 identified by the hash keys 206. In this way, the data item 202 is added to the bloom filter 210 and can be used to identify future data items from stream 224 that are potential duplicates.

The hash key index updater 216 is a software or hardware component operable to update an index of hash keys 220 by adding at least one of the hash keys 206a, 206b and 206c to the index 220. The hash key index 220 is a storage of hash key values for data items received from stream 224. One of the hash keys 206a, 206b or 206c is selected and stored in the index 220. In use, the index 220 is used by an actual duplicate checker 218 (described in detail below) to determine if a potential duplicate data item is an actual duplicate. The index 220 can be stored as a file or any other suitable data storage medium. Preferably, the index 220 is itself stored as a hashed data structure such that, when storing one of the hash keys 206 to the index 220, the hash key is first hashed by some suitable hashing algorithm to identify a location in the hashed index 220 for its storage. In this way the index 220 is efficient for the storage, retrieval and searching of entries.

Preferably, the hash key selected for storage in the index 220 is generated by an algorithm that provides a unique hash key for the substantive content of data item 202. In this way, checks of the index 220 can identify an earlier received data item having the same substantive content.

The non-duplicate processor 212 is further operable to generate an output for the duplicate detector 222 indicating that the data item 202 is not a duplicate.

The duplicate detector further includes actual duplicate checker 218 which is a software or hardware component for checking whether a selected one of the hash keys 206 is present in the index of hash keys 220. The selected one of the hash keys 206 should correspond to a hash key generated by one of the hashing algorithms 204 that is stored in the index 220 by the hash key updater 216. If the selected one of the hash keys 206 is located in the index 220 the actual duplicate checker 218 can confirm that the data item 202 is a certain duplicate of an earlier received data item. Accordingly, the actual duplicate checker 218 is operable to generate an output for the duplicate detector 222 indicating that the data item 202 is a duplicate. On the other hand, if the selected one of the hash keys 206 is not located in the index 220, the actual duplicate checker 218 can confirm that the data item 202 is not an actual duplicate and the non-duplicate processor 212 operates accordingly as described above for a non-duplicate data item.

The generation of the hash keys 206 by the hashing algorithms 204 is illustrated in FIG. 2 as being part of the duplicate detector. Those skilled in the art will appreciate that the generation of the hash keys 206 for the data item 202 need not be undertaken by the duplicate detector and can alternatively be undertaken at any point (such as at any point in time) up to the receipt of the data item 202 by the duplicate detector. For example, the hash keys 206 can be generated immediately following the generation of the data item 202, or at any point between the generation of the data item 202 and the receipt of the data item 202 by the duplicate detector 222.

The bloom filter 210 is preferably implemented such that each element of the filter is a binary bit. Such an arrangement provides particular advantages when checking and setting the state of elements of the bloom filter 210 since single bit check and set operations are most typically atomic operations for a computer system and are often implemented in hardware. Atomic operations offer a high degree of efficiency and performance in execution.

The hashing algorithms 204 are preferably implemented as cryptographic strength hashing algorithms, such as SHA1, MD5, CRC or others as are well known to those skilled in the art.

Figure 3:
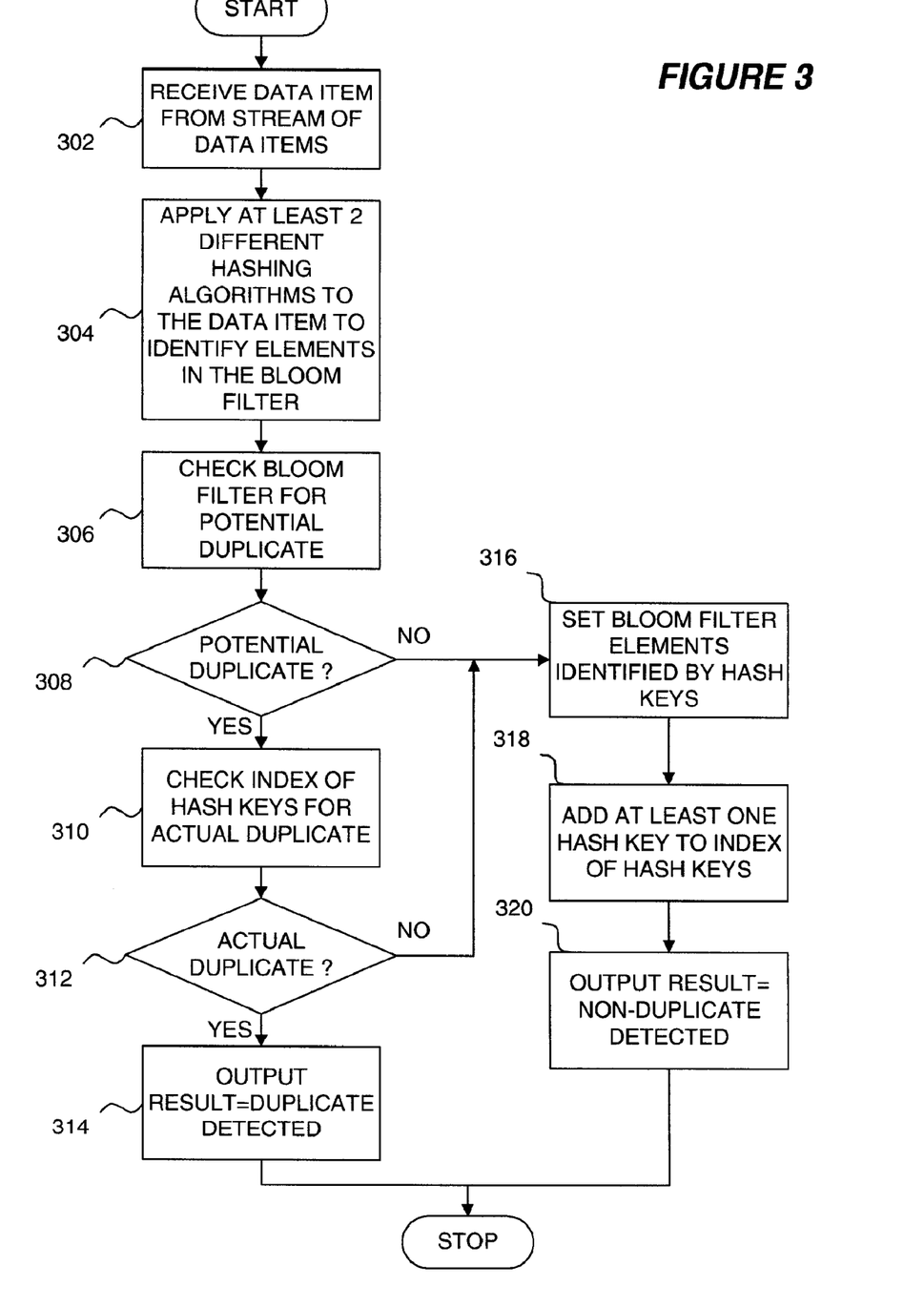
FIG. 3 illustrates a flowchart of the duplicate detector of FIG. 2 in accordance with a preferred embodiment of the present invention.

FIG. 3 is a flowchart of the duplicate detector 222 of FIG. 2 in accordance with a preferred embodiment of the present invention. At step 302 the method receives data item 202 from the stream of data items 224. At step 304 the method applies at least two different hashing algorithms 204 to the data item 202 to identify elements in the bloom filter 210. At step 306 the potential duplicate checker 208 checks the bloom filter 210 for a potential duplicate. Where a potential duplicate is detected (step 308) the actual duplicate checker 218 checks the index of hash keys 220 at step 310 to determine if the data item 202 is an actual duplicate. Where the data item 202 is located in the index of hash keys 220 it is determined to be an actual duplicate at step 310 and the actual duplicate checker 218 outputs that the data item 202 is a duplicate at step 314.

Where the potential duplicate checker 308 determines that the data item 202 is not a potential duplicate (step 308), or the actual duplicate checker 218 determines that the data item 202 is not an actual duplicate (step 312), the method proceeds to step 316. At step 316 the bloom filter setter 214 adds the data item 202 to the bloom filter by setting flags at elements of the bloom filter 210 identified by the hash keys 206. At step 318 the hash key index updater 216 adds at least one hash key to the index of hash keys 220. Subsequently, at step 320, the non-duplicate processor 212 outputs that the data item 202 is not a duplicate.

It can be seen that, in use, bloom filter 210 provides for a determination as to whether data item 202 is a potential duplicate based on the inclusion of earlier data items in the bloom filter 210 by way of hash keys. Where data item 202 is determined to be a non-duplicate in view of the bloom filter 210, a search of the index of hash keys 220 is avoided. In this way, the duplicate detector 222 permits data items that are determined to be non-duplicates in view of the bloom filter 210 to be detected and processed most efficiently without a need to interrogate a list of all data items (i.e. without interrogating the index of hash keys 220).

One aspect of resource consumed by the duplicate detector is in terms of the number of accesses to the index of hash keys 220. For example, if the index is stored as a file, accesses to the file will incur an overhead. Minimizing such accesses is therefore desirable. In use, items identified by the potential duplicate checker 208 as being non-duplicate data items pass through the duplicate detector with only one access to the index 220 (by the hash key index updater 216 writing to the index 220). Where data item 202 is identified to be a potential duplicate but is later found—with reference to the index 220—not to be an actual duplicate, the potential duplicate checker 208 can be said to have identified a "false positive". In such cases, a further disk access is required in checking the index 220 by the actual duplicate checker 218. To reduce index accesses further, it is desirable to reduce the number of false positives arising from the potential duplicate checker 208.

Figure 4:
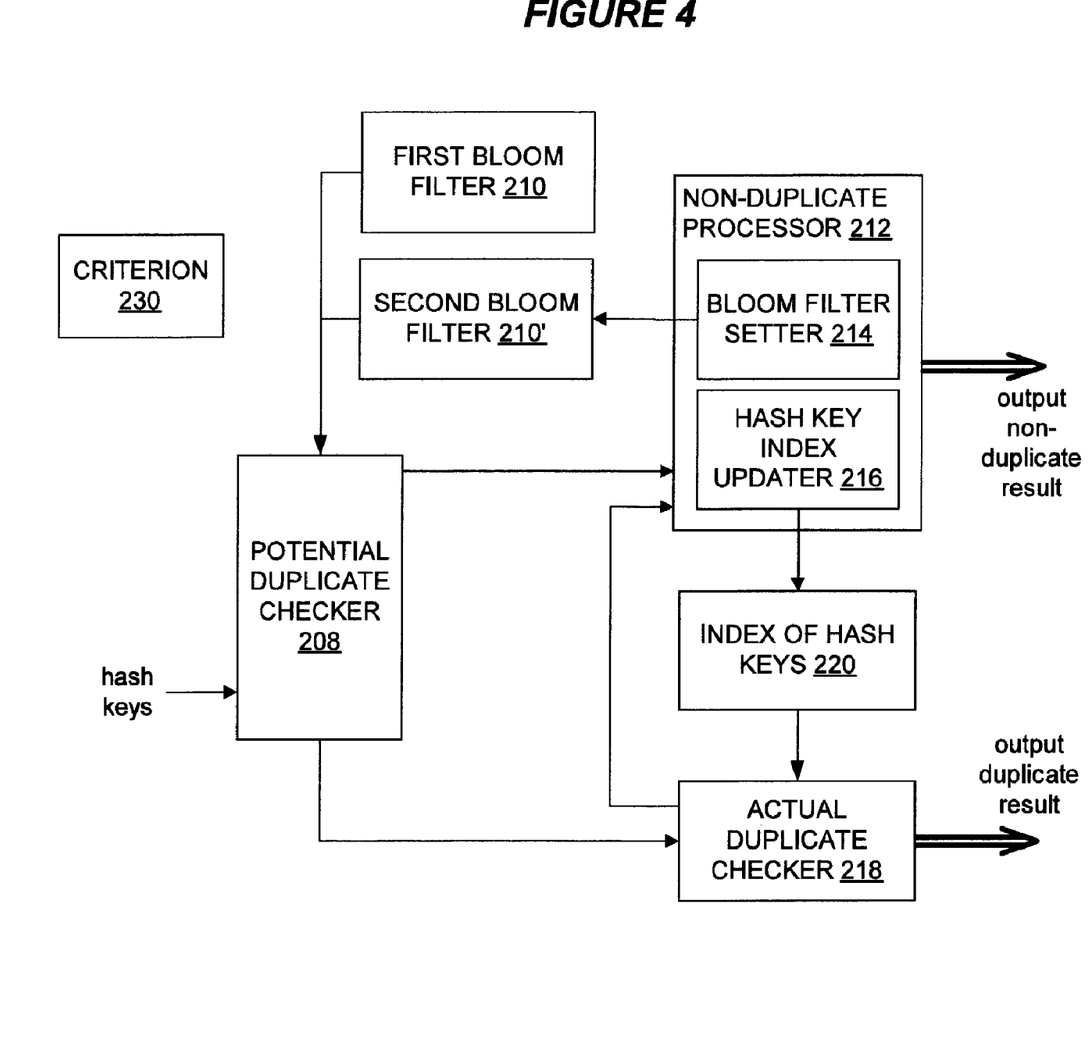
FIG. 4 illustrates a block diagram of a duplicate detector in accordance with an alternative embodiment of the present invention.

FIG. 4 is a block diagram of a duplicate detector in accordance with an alternative embodiment of the present invention. The arrangement of FIG. 4 is adapted so as to limit or reduce a number of false positives arising from the potential duplicate checker 208. Many of the elements of FIG. 4 are identical to those described above with respect to FIG. 2 and these will not be repeated here. FIG. 4 includes a predetermined criterion 230 suitable to inform a determination as to when a second bloom filter 210' should be created. Possible embodiments of the criterion 230 are described in detail below. The second bloom filter 210' is a new bloom filter generally corresponding (in dimensions and configuration) to the existing first bloom filter 210. On creation, the second bloom filter 210' is empty. That is to say that no data items are reflected in the second bloom filter 210' on creation and all flags are unset. The purpose of the second bloom filter 210' is to provide an empty bloom filter that will ultimately replace the first bloom filter 210 so as to generally limit or reduce a number of false positives arising from the potential duplicate checker 208.

In operation, on introduction of the second bloom filter 210' in response to the satisfaction of the criterion 230, the arrangement gradually transitions from utilizing the first bloom filter 210 to utilizing the second bloom filter 210' with some period of overlap where both bloom filters are utilized to some extent. During this period of overlap the arrangement can be said to be in a "transition phase". The period of overlap is preferably a time period corresponding to a period over which duplicates are preferably detected. Such a period will generally be a design choice. For example, a system designer may determine that duplicates arising more than 900 seconds apart are not problematic. Accordingly, in the process of transitioning from the first bloom filter 210 to the second bloom filter 210', it is necessary for the first bloom filter 210 to be available to the system for at least 900 seconds. After this period, the first bloom filter 210 can become discardable and the system can operate with reference only to the second bloom filter 210'. Those skilled in the art will appreciate that the arrangement is intended to operate on an ongoing basis such that a subsequent, further new bloom filter may be created on satisfaction of the criterion 230 for the second bloom filter 210', and so on.

Once the criterion 230 has determined that the second bloom filter 210' is to be created, the operation of the potential duplicate checker 208 and the non-duplicate processor 212 is adapted to employ the second bloom filter 210' as follows. The potential duplicate checker 208 is adapted to use the second bloom filter 210' for checking if data item 202 is a potential duplicate. Further, the bloom filter setter 214 is adapted to set flags in elements of the second bloom filter 210' identified by the hash keys 206. During the transition period the potential duplicate checker 208 is also operable to use the first bloom filter 210 (in addition to the second bloom filter 210') for checking if data item 202 is a potential duplicate. It is in this way that potential duplicates from both bloom filters can be identified for the entire period of transition.

The criterion 230 is any criterion suitable for determining a state of the first bloom filter 210 when a rate of production of false positive results arising from the potential duplicate checker 208 rises above a satisfactory rate. For example, the duplicate detector 222 can include a false positive counter (not shown) that is incremented each time the potential duplicate checker 208 produces a false positive result. In such an arrangement, the criterion 230 can be a threshold number of false positives, beyond which a second bloom filter 210' should be introduced. Alternatively, the duplicate detector 222 can record a rate of false positives arising from the potential duplicate detector 208, such as a number of false positive results arising per number of data items received from the stream 224. In such an arrangement the criterion 230 can include a threshold rate. Such a threshold rate is preferably in the region of 0.002% of all data items received from the stream 224.

An alternative technique for determining when the rate of production of false positives is greater than a satisfactory rate is to monitor what proportion of the elements of the bloom filter 210 are set. Generally, the greater the number of elements that are set in the bloom filter 210, the greater the likelihood of false positives. Preferably, the transition to the second bloom filter 210' will occur when the proportion of elements set in the bloom filter 210 is in the range of 10 to 20 percent of all elements. Most preferably, the transition to the second bloom filter 210' will occur when the proportion of elements set in the bloom filter 210 is 15% of all elements. The criterion 230 can be used to specify such proportions and can therefore be used to determine when a transition to the second bloom filter 210' should take place.

The bloom filters 210 and 210' are preferably arranged to have a size corresponding to a number of elements that is a product of an estimated frequency of receipt of data items from the stream 224, a length of a transition period and a value corresponding to a preferred proportion of the elements of the bloom filter. In this way the bloom filters 210 and 210' can operate most efficiently in the arrangement of FIG. 4.

Thus, in transitioning from an existing bloom filter to a new bloom filter in response to a predetermined criterion, it is possible to reduce or limit a number of false positive results arising from the potential duplicate checker 208 on an ongoing basis. In reducing a number of false positives, the number of accesses to the index of hash keys 220 is also reduced in those cases where data item 202 is not a duplicate.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of duplicate detection for data items in a stream of data items, the method comprising:

receiving a data item from the stream of data items;

applying at least two different hashing algorithms to the data item to generate hash keys that identify elements in a first bloom filter data structure having a plurality of elements;

checking a state of each of the identified elements to determine whether the data item is a potential duplicate, the determination depending on whether the identified elements are indicated as having been also identified for a previous data item received from the stream;

in response to the determination that the data item is a potential duplicate, checking an index of hash keys to determine if at least one of the generated hash keys exists in the index to identify the data item as an actual duplicate;

in response to determining that at least one of the generated hash keys exists in the index, identifying the data item as an actual duplicate;

in response to a determination that a predetermined criterion is satisfied, a second bloom filter data structure is generated and the generated hash keys identify elements in both the first and second bloom filter data structures, and the determination that the data item is a potential duplicate depends on whether the identified elements are indicated as having been also identified for a previous data item received from the stream in any of the first and second bloom filter data structures;

in response to a determination that the data item is not one of an actual duplicate, adding at least one of the generated hash keys to the index of hash keys and indicating, in the bloom filter data structure, that the identified elements have been identified for the data item; and wherein the first bloom filter data structure is discardable after a predetermined time period.

2. The method of claim 1 further comprising:
in response to a determination that the data item is not one of a potential duplicate, adding at least one of the generated hash keys to the index of hash keys and indicating, in the first bloom filter data structure, that the identified elements have been identified for the data item.

3. The method of claim 2 wherein the at least two different hashing algorithms comprise three different hashing algorithms.

4. The method of claim 1 wherein the predetermined criterion includes a condition that a predetermined proportion of the elements of the bloom filter are used to indicate a data item having been received from the stream.

5. The method of claim 4 wherein the predetermined proportion of the elements of the first bloom filter is he region of 10 to 20 percent of the elements.

6. The method of claim 5 wherein the predetermined proportion of the elements of the first bloom filter is 15% of the elements.

7. The method of claim 1 further comprising:
in response to a determination that the data item is a potential duplicate and the data item is not an actual duplicate, incrementing a false positive counter.

8. The method of claim 7 wherein the predetermined criterion includes a condition that the false positive counter does not exceed a predetermined threshold.

9. The method of claim 7 wherein the predetermined threshold is defined in terms of a proportion of all data items received from the stream.

10. The method of claim 9 wherein the predetermined threshold is 0.002% of all data items received from the stream.

11. The method of claim 1 wherein the first and second bloom filter data structures have a size corresponding to a number of elements that is a product of an estimated frequency of receipt of data items from the stream, a length of a period that the bloom filter data structure is required to represent and a value corresponding to the predetermined proportion of the elements of the bloom filter.

12. A system for duplicate detection for data items in a stream of data items, the system comprising:
means for receiving a data item from the stream of data items;

means for applying at least two different hashing algorithms to the data item to generate hash keys that identify elements in a first bloom filter data structure having a plurality of elements;

means for checking a state of each of the identified elements to determine if the data item is a potential duplicate, the determination depending on whether the identified elements are indicated as having been also identified for a previous data item received from the stream;

means for, in response to the determination that the data item is a potential duplicate, checking an index of hash keys to determine if at least one of the generated hash keys exists in the index to identify the data item as an actual duplicate;

means for, in response to determining that at least one of the generated hash keys exists in the index, identifying the data item as an actual duplicate;

means for, in response to a determination that a predetermined criterion is satisfied, means for generating a second bloom filter data structure, wherein the generated hash keys identify elements in both the first and second bloom filter data structures, and the determination that the data item is a potential duplicate depends on whether the identified elements are indicated as having been also identified for a previous data item received from the stream in any of the first and second bloom filter data structures;

means for, in response to a determination that the data item is not one of an actual duplicate, adding at least one of the generated hash keys to the index of hash keys and indicating, in the bloom filter data structure, that the identified elements have been identified for the data item; and wherein the first bloom filter data structure is discardable after a predetermined time period.

13. The system of claim 12 further comprising:
means for, in response to a determination that the data item is not one of a potential duplicate, adding at least one of the generated hash keys to the index of hash keys and indicating, in the first bloom filter data structure, that the identified elements have been identified for the data item.

14. The system of claim 13 wherein the at least two different hashing algorithms comprise three different hashing algorithms.

15. The system of claim 12 wherein the predetermined criterion includes a condition that a predetermined proportion of the elements of the first bloom filter are used to indicate a data item having been received from the stream.

16. A computer program product having a non-transitory storage type device comprising computer program code to, when loaded into a computer system and executed thereon, cause the computer to perform a method of duplicate detection for data items in a stream of data items, the computer program product comprising:

computer program code for receiving a data item from the stream of data items;

computer program code for applying at least two different hashing algorithms to the data item to generate hash keys that identify elements in a first bloom filter data structure having a plurality of elements;

computer program code for checking a state of each of the identified elements to determine whether the data item is a potential duplicate, the determination depending on whether the identified elements are indicated as having been also identified for a previous data item received from the stream;

computer program code for in response to the determination that the data item is a potential duplicate, checking an index of hash keys to determine if at least one of the generated hash keys exists in the index to identify the data item as an actual duplicate;

computer program code for in response to determining that at least one of the generated hash keys exists in the index, identifying the data item as an actual duplicate;

computer program code for in response to a determination that a predetermined criterion is satisfied, a second bloom filter data structure is generated and the generated hash keys identify elements in both the first and second bloom filter data structures, and the determination that the data item is a potential duplicate depends on whether the identified elements are indicated as having been also identified for a previous data item received from the stream in any of the first and second bloom filter data structures;

computer program code for in response to a determination that the data item is not one of an actual duplicate, adding at least one of the generated hash keys to the index of hash keys and indicating, in the bloom filter data structure, that the identified elements have been identified for the data item; and wherein the first bloom filter data structure is discardable after a predetermined time period.

* * * * *